US008452328B2

(12) United States Patent
Marko

(10) Patent No.: US 8,452,328 B2
(45) Date of Patent: May 28, 2013

(54) METHOD AND SYSTEM OF SHARING A CONTROLLER FOR A COMBINED CELLULAR PHONE AND SATELLITE RADIO

(75) Inventor: Paul Marko, Pembroke Pines, FL (US)

(73) Assignee: Sirius XM Radio Inc., New York, NY (US)

( * ) Notice: Subject to any disclaimer, the term of this patent is extended or adjusted under 35 U.S.C. 154(b) by 1172 days.

(21) Appl. No.: 12/120,932

(22) Filed: May 15, 2008

(65) Prior Publication Data

US 2008/0287122 A1 Nov. 20, 2008

Related U.S. Application Data

(60) Provisional application No. 60/938,133, filed on May 15, 2007.

(51) Int. Cl.
*H04M 1/00* (2006.01)
*H04B 7/19* (2006.01)
*H04B 7/185* (2006.01)

(52) U.S. Cl.
USPC .... 455/553.1; 455/13.2; 455/13.3; 455/552.1

(58) Field of Classification Search
USPC .................................... 455/13.2, 13.3, 553.1
See application file for complete search history.

(56) References Cited

U.S. PATENT DOCUMENTS

| | | | | |
|---|---|---|---|---|
| 5,903,835 | A * | 5/1999 | Dent | 455/427 |
| 7,224,935 | B2 | 5/2007 | Messina et al. | |
| 7,292,848 | B2 | 11/2007 | Mazzara, Jr. et al. | |
| 7,313,467 | B2 | 12/2007 | Breed et al. | |
| 7,362,999 | B2 | 4/2008 | Petschke et al. | |
| 7,502,625 | B2 * | 3/2009 | Beamish et al. | 455/553.1 |
| 2002/0177476 | A1 * | 11/2002 | Chou | 455/574 |
| 2006/0003762 | A1 | 1/2006 | Sumcad et al. | |
| 2006/0057956 | A1 | 3/2006 | Grau et al. | |
| 2006/0240811 | A1 | 10/2006 | De Luca | |
| 2007/0014536 | A1 * | 1/2007 | Hellman | 386/94 |
| 2007/0132639 | A1 * | 6/2007 | Korneluk et al. | 342/464 |
| 2007/0171891 | A1 * | 7/2007 | Tran | 370/352 |

* cited by examiner

*Primary Examiner* — Huy C Ho
(74) *Attorney, Agent, or Firm* — Kramer Levin Naftalis & Frankel LLP

(57) ABSTRACT

A method (300) and system (100) for sharing a controller for a combined cellular phone and satellite radio includes a cellular phone module (102), a satellite radio module (106), and a controller module (108) having a digital signal processor (120) shared by the cellular and satellite modules. A base band processor (118) of the satellite module can provide a digital audio output (107) to a stereo decoder (122) of the controller module and a base band module (112) of the cellular phone module can provide a digital audio output (109) to the stereo decoder. The base band processor of the satellite module can provide compressed audio (111) to the DSP for longer term storage within a memory (129). The DSP can also receive control signaling (113) from the base band processor of the satellite radio module and control signaling (117) from the base band processor of the cellular phone module.

16 Claims, 3 Drawing Sheets

100

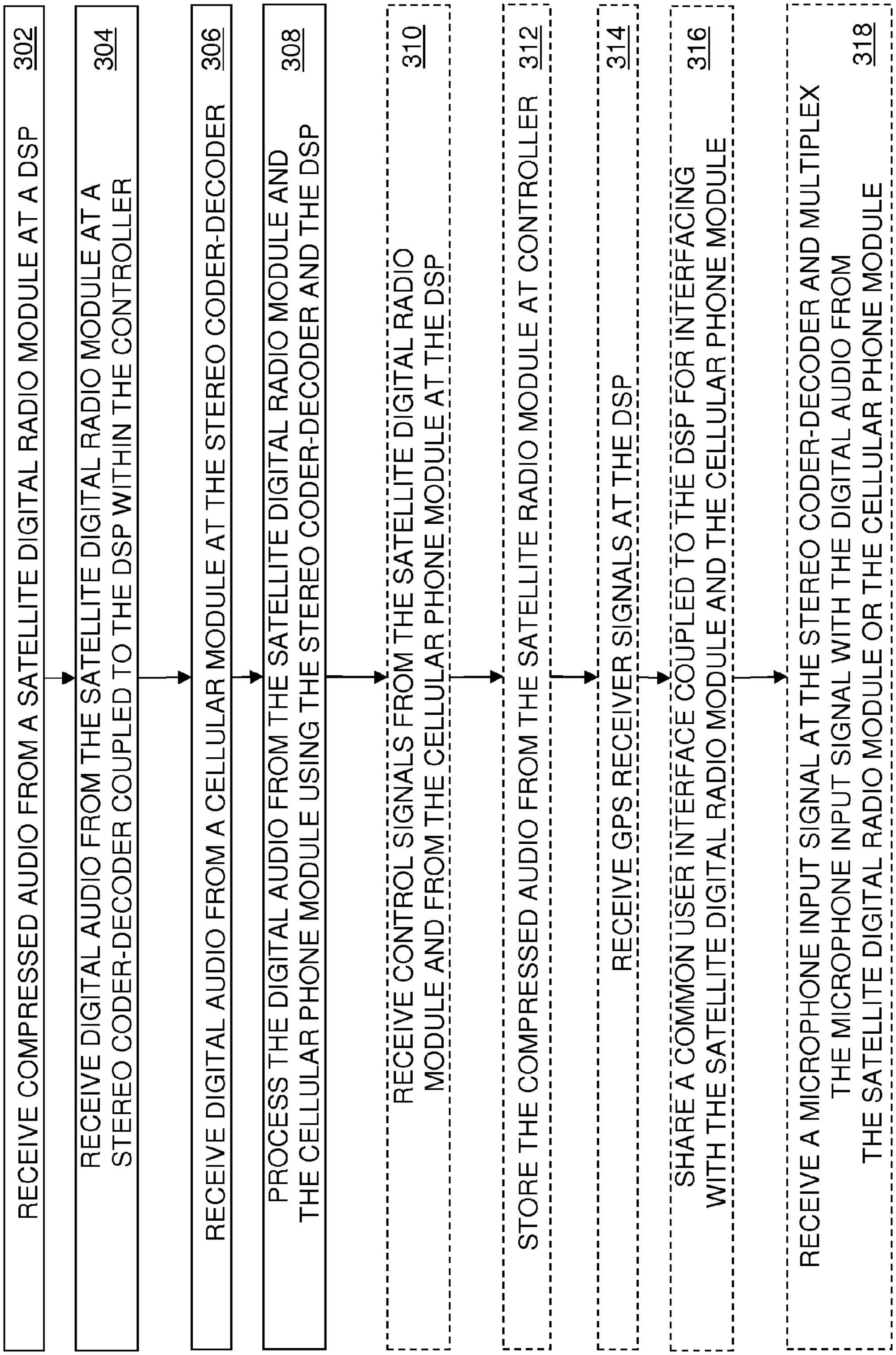
300 FIG. 3

METHOD AND SYSTEM OF SHARING A CONTROLLER FOR A COMBINED CELLULAR PHONE AND SATELLITE RADIO

CROSS-REFERENCE TO RELATED APPLICATIONS (Not applicable)

FIELD OF THE INVENTION

The invention relates generally to a portable communication product, and more particularly to a combined cellular phone and satellite radio sharing a controller and a method of sharing such controller.

BACKGROUND OF THE INVENTION

Satellite radio operators are providing digital radio broadcast services covering the entire continental United States. These services offer approximately 100 channels that include music, news, sports, talk and data channels. Digital radio may also be available in the near future from conventional analog radio broadcasters that will provide a terrestrial based system using signals co-located in the AM and FM bands. Satellite radios typically use a quadrifilar type antenna that needs to have direct exposure to a signal transmitted from a satellite.

Cellular phones are ubiquitous in practically every developed nation. In the continuing effort of merging and consolidating differing technologies, several manufacturers are contemplating combining satellite radios and cellular phones in an integrated product. Proposals fail to contemplate efficient use of the resources that might be commonly used by both products.

SUMMARY OF THE INVENTION

In a first aspect of the present invention, a combined cellular phone and satellite radio can include a cellular phone module having a base band processor, a satellite radio module having a base band processor, and a controller module having a digital signal processor (DSP) shared by the cellular phone module and satellite radio module. The base band processor of the satellite radio module can provide a digital audio output to a stereo decoder of the controller module and the base band module of the cellular phone module can provide a digital audio output to the stereo decoder. The base band processor of the satellite radio module can provide compressed audio to the DSP for longer term storage within a memory within the controller module. The DSP can retrieve the compressed audio from the memory and can route the compressed audio via the base band processor of the satellite radio module for conversion to digital audio and subsequent play by the stereo decoder. The base band processor can be coupled to a memory for short term storage of compressed audio. The DSP can also receive control signaling from the base band processor of the satellite radio module and control signaling from the base band processor of the cellular phone module. The combined cellular phone and satellite radio can further include a global positioning satellite (GPS) receiver coupled to the DSP. The combined cellular phone and satellite radio can also include a shared user interface coupled to the DSP.

In a second aspect of the present invention, a controller for a combined cellular phone and satellite radio can include a digital signal processor (DSP) having inputs for receiving compressed audio and control signaling from a base band signal processor for a satellite radio module and a stereo coder-decoder coupled to the DSP where the stereo coder-decoder has inputs for receiving digital audio from a base band signal processor for the satellite radio module and from a base band signal processor for a cellular phone module. The stereo coder-decoder can further include an input for a microphone and an audio multiplexer. The base band signal processor of the satellite radio module can provide compressed audio to the DSP for longer term storage within a memory within the controller. The DSP can retrieve the compressed audio from the memory and can route the compressed audio via the base band processor of the satellite radio module for conversion to digital audio and subsequent play by the stereo coder-decoder. The DSP can also receive control signaling from the base band signal processor of the satellite radio module and control signaling from the base band processor of the cellular phone module. The DSP can further include an input for receiving data from a global positioning satellite (GPS) receiver. Note, the DSP can also be coupled to a shared user interface utilized by both the satellite radio module and the cellular phone module.

In a third aspect of the present invention, a method of sharing a controller having a digital signal processor (DSP) among a cellular phone module and satellite digital radio module can include the steps of receiving compressed audio from the satellite digital radio module at the DSP, receiving digital audio from the satellite digital radio module at a stereo coder-decoder coupled to the DSP within the controller, receiving digital audio from the cellular phone module at the stereo coder-decoder, and processing the digital audio from the satellite digital radio module and the cellular phone module using the stereo coder-decoder and the DSP. The method can further include the step of receiving control signals from the satellite digital radio module and from the cellular phone module at the DSP. The method can further include the step of storing the compressed audio from the satellite digital radio module at the controller. The method can optionally include receiving global positioning satellite (GPS) receiver signals at the DSP. The method can also share a common user interface coupled to the DSP for interfacing with the satellite digital radio module and the cellular phone module. The method can also receive a microphone input signal at the stereo coder-decoder and multiplex the microphone input signal with the digital audio from the satellite digital radio module or the cellular phone module

BRIEF DESCRIPTION OF THE DRAWINGS

FIG. 3 is a flow chart illustrating a method of sharing a controller within a combined cellular phone and satellite digital radio unit in accordance with an embodiment of the present invention.

DETAILED DESCRIPTION OF THE DRAWINGS

As previously stated, satellite radio operators are providing digital radio service to the continental United States. Briefly, the service provided by XM Satellite Radio includes a satellite X-band uplink (not shown) to two satellites which provide frequency translation to the S-band for re-transmission to radio receivers on earth within a predetermined coverage area. Radio frequency carriers from one of the satellites are also received by terrestrial repeaters. The content received at the repeaters is retransmitted at a different S-band carrier to the same radio receivers that are within their respective coverage areas. These terrestrial repeaters facilitate reliable reception in geographic areas where LOS reception from the satellites is obscured by tall buildings, hills, tunnels and other obstructions. The existing SDARS receivers are designed to receive one or both of the satellite signals at one antenna and the signals from the terrestrial repeaters at another antenna and combine or select one of the signals as the receiver output.

Figure 1:
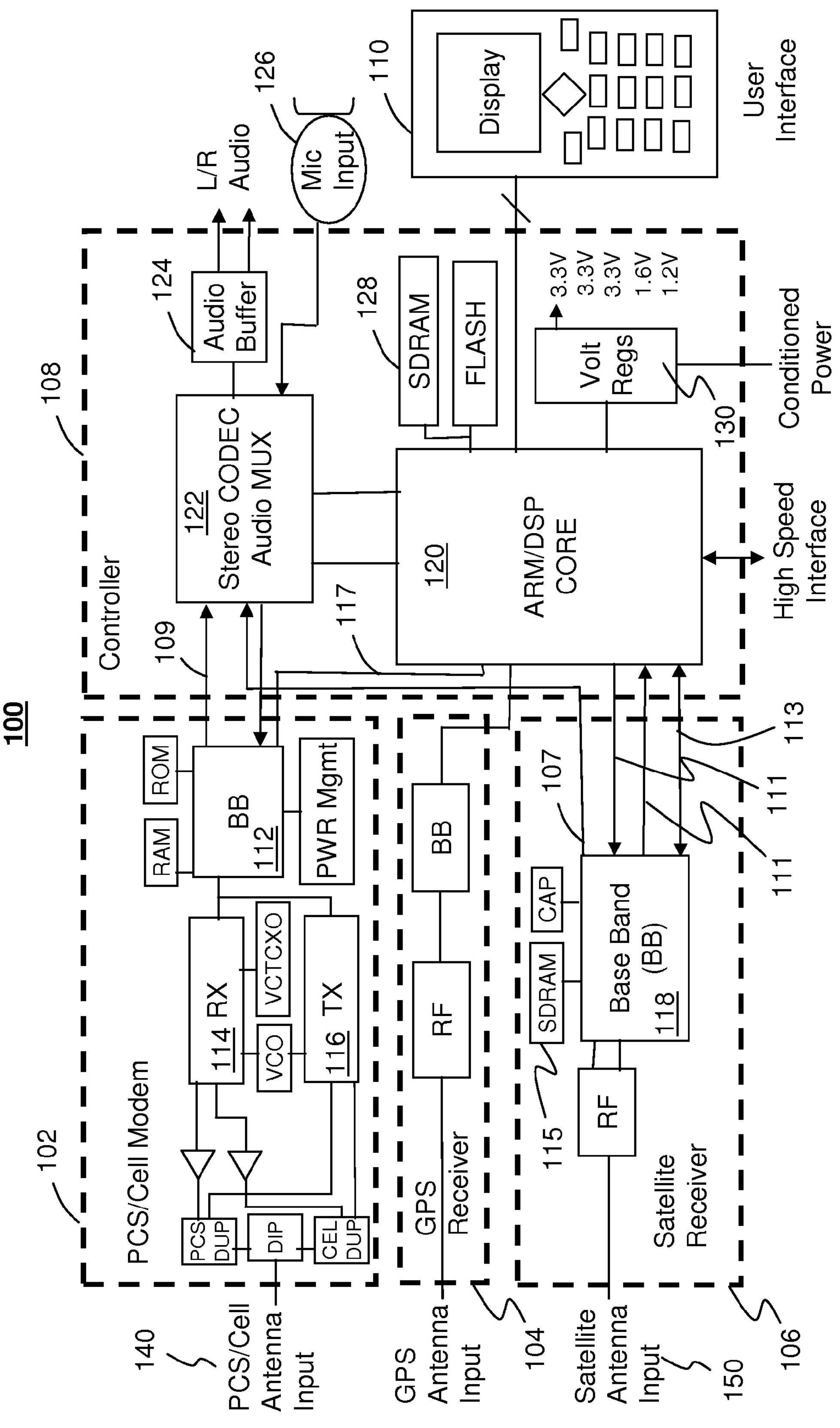
FIG. 1 illustrates a block diagram of a combined cellular phone and satellite digital audio receiver unit in accordance with an embodiment of the present invention.
Figure 2:
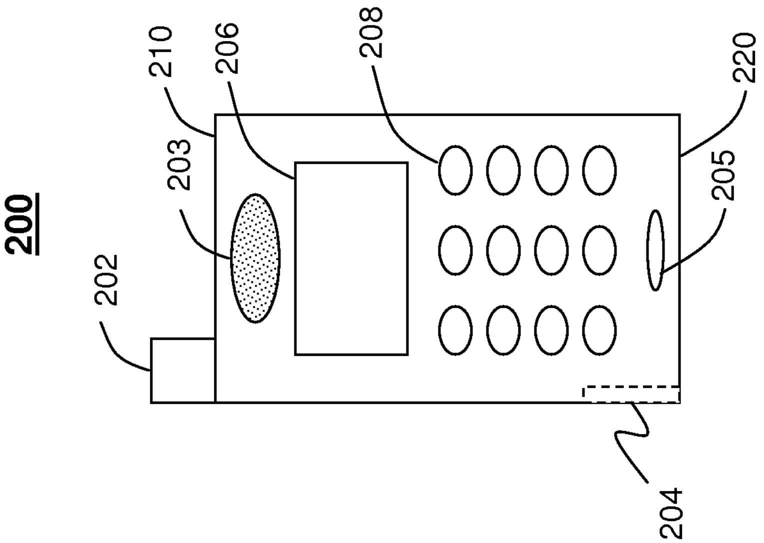
FIG. 2 illustrates another block diagram of a combined cellular phone and satellite digital audio receiver unit in accordance with an embodiment of the present invention.

The proposed embodiments contemplate a combined cellular phone and satellite digital radio in a communication unit 100 or 200 as similarly shown in FIGS. 1 and 2 respectively. The communication unit 100 of FIG. 1 illustrates more of an internal block diagram while the unit 200 of FIG. 2 illustrates an external depiction.

Referring again to FIG. 1, the combined communication unit 100 can include a cellular phone module 102 having an antenna 140 and a base band processor 112, a satellite radio module 106 having an antenna 150 and a base band processor 118, and a controller module 108 having a digital signal processor (DSP) 120 shared by the cellular phone module 102 and satellite radio module 106. The cellular phone module 102 can include a receiver 114 and a transmitter 116 (or transceiver) along with other components typically included in a cellular device such as voltage controlled oscillators (VCOs), memory, amplifiers, power management modules, duplexers and the like. The satellite radio module 106 can include a receiver or radio frequency (RF) front end as well as memory (115) and the base band processor 118. The DSP 120 can be an ARM Core processor having a high speed interface and coupled to a voltage regulator 130 that can provide multiple voltage level outputs.

The base band processor 118 of the satellite radio module 106 can provide a digital audio output 107 to a stereo decoder 122 of the controller module 108 and the base band module 112 of the cellular phone module 102 can provide a digital audio output 109 to the stereo decoder 122. The base band processor 118 of the satellite radio module 106 can provide compressed audio 111 to the DSP 120 for longer term storage within a memory 128 such as SDRAM or FLASH memory within the controller module 108. The DSP 120 can retrieve the compressed audio from the memory 128 and can route the compressed audio 111 via the base band processor 118 of the satellite radio module 106 for conversion to digital audio (107) and subsequent play by the stereo decoder 122. The stereo decoder (which can be a part of a combined coder-decoder and audio multiplexer) can output the digital audio to an audio buffer 124 before providing such outputs to a speaker for example. The base band processor 118 can also be coupled to a memory 115 for short term storage of compressed audio 111. The DSP 120 can also receive control signaling 113 from the base band processor 118 of the satellite radio module 106 and control signaling 117 from the base band processor 112 of the cellular phone module 102. The combined cellular phone and satellite radio 100 can further include a global positioning satellite (GPS) receiver 104 coupled to the DSP 120. The GPS receiver 104 can also include a radio frequency (RF) front end and a base band processor. The combined cellular phone and satellite radio 100 can also include a shared user interface 110 coupled to the DSP 120. The user interface 110 can include one or more among a display, keypad, or other input or output devices.

The communication unit 200 can include a satellite antenna 202 strategically placed at a top portion 210 of the communication unit 200 and a cellular antenna 204 placed at a bottom portion 220 of the communication unit 200. The satellite antenna 202 can be placed near a speaker 203 such as an earpiece speaker that is near the top portion 210. The cellular antenna 204 can be placed near a microphone 205 that is near the bottom portion 220. The communication unit can optionally include a keypad 208 and display 206 as part of a user interface that can be shared by a cellular phone module and a satellite radio module shared by this unit 200. Note, the communication units 200 is not limited to the arrangement described and can have components such as antennas, speakers, microphones, displays and keypads in various alternative arrangements or form factors. Further note that although the unit 100 is illustrated in a monolith form factor, the embodiments herein are not necessarily limited to such form factor and can include others such as a flip phone form factor.

Referring to FIG. 3, a flow chart illustrating a method 300 sharing a controller having a digital signal processor (DSP) among a cellular phone module and satellite digital radio module. The method 300 can include the step 302 of receiving compressed audio from the satellite digital radio module at the DSP, receiving at step 304 digital audio from the satellite digital radio module at a stereo coder-decoder coupled to the DSP within the controller, receiving digital audio from the cellular phone module at the stereo coder-decoder at step 306, and processing at step 308 the digital audio from the satellite digital radio module and the cellular phone module using the stereo coder-decoder and the DSP. The method can further include the optional step 310 of receiving control signals from the satellite digital radio module and from the cellular phone module at the DSP. The method can further include the step 312 of storing the compressed audio from the satellite digital radio module at the controller. The method can optionally include receiving global positioning satellite (GPS) receiver signals at the DSP at step 314. The method can also share a common user interface coupled to the DSP for interfacing with the satellite digital radio module and the cellular phone module at step 316. The method 300 can also receive a microphone input signal at the stereo coder-decoder and multiplex the microphone input signal with the digital audio from the satellite digital radio module or the cellular phone module at step 318. Although the steps shown in this example are in a certain order, it should be understood that embodiments in contemplation with the present invention can include steps in any number of different orderings and with fewer or additional.

The description above is intended by way of example only and is not intended to limit the present invention in any way except as set forth in the following claims.

I claim:

1. A combined cellular phone and satellite radio, comprising:

a cellular phone module having a base band processor;

a satellite radio module having a base band processor, said module comprising circuitry to receive and decode stereo digital audio signals;

a controller module having a digital signal processor (DSP) shared by the cellular phone module and satellite radio module; and a microphone, wherein the base band processor of the satellite radio module provides a digital audio output to a stereo decoder of the controller module and the base band module of the cellular phone module provides a digital audio output to the stereo decoder, and wherein the stereo decoder multiplexes a microphone input signal received at the microphone with digital audio from the satellite digital radio module or the cellular phone module.

2. The combined cellular phone and satellite radio of claim 1, wherein the base band processor of the satellite radio module provides compressed audio to the DSP for longer term storage within a memory within the controller module.

3. The combined cellular phone and satellite radio of claim 2, wherein the DSP retrieves the compressed audio from the memory and routes the compressed audio via the base band processor of the satellite radio for conversion to digital audio and play by the stereo decoder.

4. The combined cellular phone and satellite radio of claim 1, wherein the base band processor is coupled to a memory for short term storage of compressed audio.

5. The combined cellular phone and satellite radio of claim 1, wherein the DSP receives control signaling from the base band processor of the satellite radio module and control signaling from the base band processor of the cellular phone module.

6. The combined cellular phone and satellite radio of claim 1, wherein combined cellular phone and satellite radio further comprises a global positioning satellite (GPS) receiver coupled to the DSP.

7. The combined cellular phone and satellite radio of claim 1, wherein combined cellular phone and satellite radio further comprises a shared user interface coupled to the DSP.

8. The combined cellular phone and satellite radio of claim 1, wherein the satellite radio module is arranged to receive one or more satellite signals at one antenna and terrestrial repeater signals at another antenna.

9. A controller for a combined cellular phone and satellite radio that is provided with a microphone, comprising:

- a digital signal processor (DSP) having inputs for receiving compressed audio and control signaling from a base band signal processor for a satellite radio module, said compressed audio including stereo digital audio signals; and
- a stereo decoder coupled to the DSP, wherein the stereo decoder has inputs for receiving digital audio from a base band signal processor for the satellite radio module and from a base band signal processor for a cellular phone module;
- wherein the stereo decoder further includes an input for a microphone and an audio multiplexer, and
- wherein the stereo decoder multiplexes a microphone input signal received at a microphone with digital audio from the satellite digital radio module or the cellular phone module.

10. The controller of claim 9, wherein the base band signal processor of the satellite radio module provides compressed audio to the DSP for longer term storage within a memory within the controller.

11. The controller of claim 10, wherein the DSP retrieves the compressed audio from the memory and routes via the base band processor of the satellite radio module for conversion to digital audio and play by the stereo decoder.

12. The controller of claim 9, wherein the DSP receives control signaling from the base band signal processor of the satellite radio module and control signaling from the base band processor of the cellular phone module.

13. The controller of claim 9, wherein the DSP further comprises an input for receiving data from a global positioning satellite (GPS) receiver.

14. The controller of claim 9, wherein the DSP is coupled to a shared user interface utilized by both the satellite radio module and the cellular phone module.

15. A method of sharing a controller having a digital signal processor (DSP) among a cellular phone module and satellite digital radio module, comprising the steps of:

- receiving compressed audio from the satellite digital radio module at the DSP;
- receiving digital audio from the satellite digital radio module at a stereo decoder coupled to the DSP within the controller;
- receiving digital audio from the cellular phone module at the stereo decoder; and
- processing the digital audio from the satellite digital radio module and the cellular phone module using the stereo decoder and the DSP; and
- receiving a microphone input signal at the stereo decoder and multiplexing the microphone input signal with the digital audio from the satellite digital radio module or the cellular phone module,
- wherein said compressed digital audio includes stereo digital audio signals.

16. The method of claim 15, wherein the method further comprises at least one of:

(i) receiving control signals from the satellite digital radio module and from the cellular phone module at the DSP, (ii) storing the compressed audio from the satellite digital radio module at the controller, (iii) receiving global positioning satellite (GPS) receiver signals at the DSP, and (iv) sharing a common user interface coupled to the DSP for interfacing with the satellite digital radio module and the cellular phone module.

* * * * *